March 14, 1972   E. W. CRONIN   3,649,731
METHOD OF REINFORCING FOAM SHEETS
Filed April 30, 1969
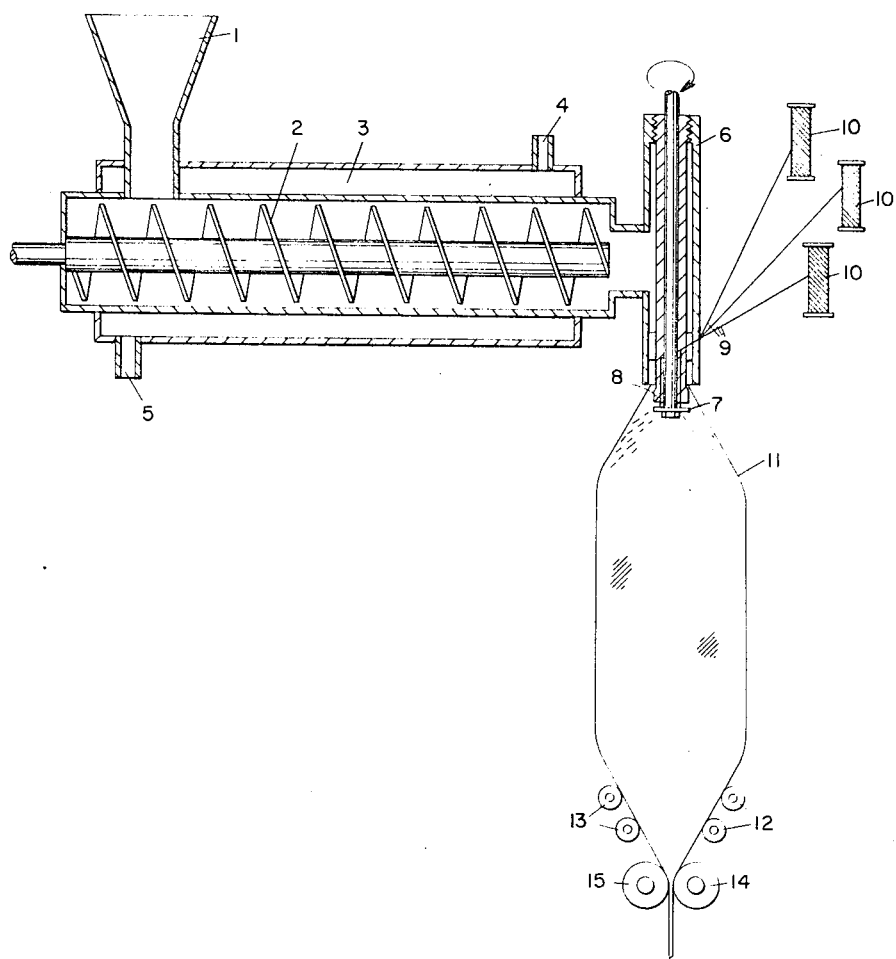
EDWARD W. CRONIN
INVENTOR
BY
ATTORNEY United States Patent Office 3,649,731
Patented Mar. 14, 1972

3,649,731
METHOD OF REINFORCING FOAM SHEETS
Edward W. Cronin, Sedgely Farms, Wilmington, Del., assignor to Hercules Incorporated, Wilmington, Del.
Filed Apr. 30, 1969, Ser. No. 820,423
Int. Cl. B29d 3/02, 27/00
U.S. Cl. 264—47                                    6 Claims

ABSTRACT OF THE DISCLOSURE

Reinforced foam sheets can be prepared by forcing, such as extruding, a foamable thermoplastic polymer composition through an annular die, foaming in the form of a tube at the die face, lining the inside of the tube with fibrous material and then collapsing the tube to make a single integral laminated sheet.

---

This invention relates to a process of preparing reinforced foam sheets. More particularly, this invention relates to a process of preparing reinforced laminated sheets composed of exterior layers of foam with a layer of fibrous material therebetween.

Various attempts have heretofore been directed toward the utilization of fibers and scrim in the production of reinforced polymer foam articles. It had been hoped that the presence of fibers or scrim within a foam structure might advantageously serve to improve various properties of the foam such as load support, dimensional strength, tear strength, and the like. However, attempts to prepare such reinforced structures have been unsuccessful for the reason that the presence of fibrous material during the foaming action seriously impedes cell formation. As a consequence, the products become more expensive because low density and uniformity cannot be achieved and the resulting products provide reduced properties with respect to insulation, appearance, mechanical properties, etc.

It has now unexpectedly been found that foam polymer sheets reinforced with fibrous material can be produced by forcing a foamable polymer composition through an annular die, foaming in the form of a tube at the die face, lining the inside of the tube with fibrous material and collapsing the tube to make a single integral laminated sheet composed of exterior layers of foam with a layer of fibrous material laminated in the center. Since the fibrous material is added after cell formation, and on the inside surface of the foam tube it has no adverse effect on the foam. The resulting reinforced foam sheets retain their flexibility and low density and exhibit greatly improved tear strength, tensile strength and impact resistance. These sheets are particularly useful as carpet or rug backings.

Any thermoplastic polymer can be used in the preparation of reinforced foam sheets in accordance with this invention. Typical thermoplastic polymers which can be used are cellulose ethers and esters such as ethyl cellulose, cellulose acetate, cellulose acetate butyrate, etc.; homopolymers and copolymers of monomeric compounds containing the $CH_2=C<$ grouping, such as olefins, as for example, ethylene, propylene, isobutylene, etc.; homopolymers and copolymers of vinylidene chloride; homopolymers and copolymers of the vinyl esters of carboxylic acids, as for example, vinyl acetate, vinyl stearate, vinyl benzoate, etc.; homopolymers and copolymers of the vinyl ethers, as for example, vinyl methyl ether, vinyl ethyl ether, vinyl isobutyl ether, etc.; polystyrene including crystal grade polystyrene and high impact polystyrene or mixtures of normal crystal grade polystyrene and high impact polystyrene; copolymers of styrene with other monomers such as the terpolymer of acrylonitrile, butadiene and styrene, the copolymer of butadiene and styrene, the copolymer of chlorosulfonated polyethylene and styrene, the copolymer of divinyl benzene and styrene, etc., and blends of polystyrene with other polymers such as blends of polystyrene and polybutadiene, blends of polystyrene and hydrogenated polybutadiene, blends of polystyrene and polyisoprene, etc.; poly(chlorotrifluoroethylene); homopolymers and copolymers of unsaturated carboxylic acids and derivatives thereof, such as acrylic acid, methacrylic acid, methylacrylate, ethylacrylate, methylmethacrylate, acrylamide, acrylonitrile, etc.; copolymers of vinylidene monomers with alpha-beta unsaturated polycarboxylic acids such as maleic anhydride, diethyl maleate, dibutyl fumarate, diallyl maleate, dipropyl maleate, etc.; homopolymers and copolymers of vinyl chloride, such as polyvinyl chloride, vinyl chloride-vinylacetate copolymer, vinyl chloride-acrylonitrile copolymer, etc.; homopolymers of aromatic hydrocarbons and ring halogenated derivatives thereof such as orthochlorostyrene, para-chlorostyrene, 2,5 - dichlorostyrene, 2,4 - dichlorostyrene, para - methylstyrene, para-ethylstyrene, alpha-methylstyrene, vinyl naphthalene, etc.; polycarbonates, as for example, the copolymer from bisphenol A and diphenyl carbonate; polyoxymethylene; oxymethylene-alkylene oxide copolymers, such as oxymethyleneethylene oxide copolymer; polyurethanes, such as for example, those prepared from toluene diisocyanate and polypropylene glycol; polyethylene terephthalate; polymeric hexamethylene adipamides and polyamides (nylon) etc. Of particular value in the formation of reinforced foam sheets is regular or high impact polystyrene; homopolymers and copolymers of ethylene such as high, medium, and low density polyethylene, ethylene-vinyl acetate copolymers, ethylene - methylacrylate copolymers, etc.; homopolymers and copolymers of propylene such as polypropylene, ethylene-propylene copolymers, etc.; and polyvinyl chloride.

Any high tensile strength fibrous material, which has a melting point above the extrusion temperature of the foamable polymer can be used in the process of this invention. By fibrous material is meant fibers, including monofilaments and multifilaments, and knit or woven scrim. Typical fibers are the natural fibers such as, cotton, jute, wool, asbestos, etc.; and the synthetic fibers such as, glass, viscose rayon, acetate rayon, polypropylene, nylon, polyethylene terephthalate, etc. These fibers can be of various configurations and sizes provided that they are capable of being uniformly deposited on the interior surface of the foamed tube. In general, the fibers will be from about 50 mil to about 6 inches in length and from about 1 to about 300 denier. However, in some instances (described below) it may be desirable to use a continuous filament. Typical scrim are the light weight loosely woven or knit fabrics of the natural and synthetic fibers mentioned above, such as for example, cheesecloth.

As stated above, the fiber reinforced foam sheets are prepared in accordance with this invention by forcing a foamable plastic composition through an annular die while simultaneously uniformly depositing fibrous material on the inside of the thus formed tube. The foamable plastic composition can be forced through the annular die by several methods. For example, it can be forced through a die using a single or double screw-extruder. In batch operations the foamable composition can merely be released from a pressurized vessel. Likewise, various methods can be used to uniformly deposit the fibrous material on the inside surface of the foam tube. For example, precut fibers can be blown through the center of the die and uniformly deposited on the inside surface of the tube, such as by use of a rotating air jet. By a modification of this method a continuous filament can be deposited using a rotating air jet. By still another modification scrim, fed through the die, can be forced against the inner walls of the tube by use of a rotating air jet. Another method is to equip the face of the die with a rotating cutter which will cut yarn fed through the die into the proper length fibers and throw them uniformly against the inside walls of the tube. Still another method is to equip the die with an internal mandrel which will force scrim against the inner walls of the tube. Whichever method is used care must be taken to deposit sufficient fibrous material to increase the strength of the final foam sheet, but below that amount which would prevent adhesion of the sides of the tube when it is collapsed to form the sheet. The optimum amount required will depend upon the thermoplastic used in the formation of the tube, type of fibrous material used for reinforcing, and the strength desired.

The tube as it comes out of the annular die can be allowed to expand into a foam without inflation or alternatively, it can be inflated in the form of a bubble, considerably larger than the die, while foaming.

After the formation of the foamed tube and the deposition of the fibers, but before the interior surface of the tube has cooled below its tack temperature, it is collapsed. The collapsed tube is rolled flat through a pair of calender rolls which seal the layers together forming a laminate with reinforcing material in the center. The sealing process is accomplished without any substantial densification of the foam in the calender rolls. The rolls merely even out small irregularities in the surface.

The process of this invention as stated above can be practiced in various types of apparatus. FIG. 1 is a diagrammatic drawing of the essential components of one type of apparatus for the practice of this invention. Specifically the drawing illustrates a horizontal single screw cross-head extruder equipped with a hopper 1, an extrusion screw 2 of a conventional type, a heating jacket 3, having suitable inlets or outlets 4 and 5 for passing heat exchange medium therethrough, an extrusion head 6, equipped with a rotating shaft passing through said head and terminating with cutter blades 7, and an annular die 8. Several tows 9 from spindles 10 are passed through an opening into the extruder head 6 through the annular die 8 via several openings to the cutter blades 7 which throw the fiber segments onto the interior surface of the foam tube 11 an appropriate distance from the die. The tube is progressively flattened by means of sets of rollers 12 and 13 which progressively bring the opposite sides together and direct them into the nip of a pair of calendering rolls 14 and 15, located close enough to the die such that the plastic is still tacky when it reaches the rolls.

The temperature and pressure within the pressure vessel or extruder used to force the composition through the annular die will depend upon the specific polymer or mixture of polymers being used and the amount and type of blowing agents being used. The optimum conditions for any given set of polymers, blowing agents, and mechanical assembly will readily be obvious to those skilled in the art.

Various blowing agents can be used in the process of this invention. The primary blowing agent will be volatile at ordinary room temperature and atmospheric pressure. Exemplary of the primary blowing agents which can be used are monochlorodifluoromethane, monochlorotrifluoromethane, dichlorodifluoromethane, dichlorotrifluoroethane and the like. The preferred primary blowing agent is dichlorodifluoromethane. In general, the primary blowing agent will be used in an amount of from about 1% to about 9% by weight based on the weight of the polymer. It is desirable in this process to use a secondary blowing agent which volatilizes at a temperature below the softening point of the polymer and also acts as a plasticizer. Exemplary of the secondary blowing agent are the aliphatic and cycyloaliphatic hydrocarbons having boiling points of from about 36° C. to about 130° C. such as pentane, heptane, hexane, petroleum ether, cyclohexane, cyclopentane, etc. In general the secondary blowing agents can be used in an amount of from about 1% to about 6% by weight. The blowing agent or agents can be incorporated in the polymer by any of the known methods. For example, the polymer can be compounded while in contact with the primary and secondary blowing agents under pressure such as in a plastic extruder or other suitable pressure resistant and gas type vessel or the blowing agents can be injected into the compounded polymer melt and intimately mixed. In any event it is important that the blowing agent or other agents be thoroughly and homogeneously incorporated in the polymer.

It is also desirable to incorporate small amounts of nucleating agents and mixing aids or processing lubricants in the polymer before forcing through the die. Very fine inert material such as calcium silicate, barium sulfate, silica and the like, serve as nucleation sites and insure the formation of uniform small cells. Also, decomposable agents which produce gases within the system such as citric acid, and sodium bicarbonate can be used. A particularly preferred nucleating agent is finely divided diatomaceous earth. Any of the well known mixing aids or processing lubricants can be used in the process of this invention. Preferred mixing aids are the metal stearates such as zinc stearate, calcium stearate and the like. In general the nucleating agent will be used in an amount of from about 0.02% to about 2% by weight while the mixing aid will be used in an amount of from about 0.1% to about 1% by weight.

In addition to the blowing agents, nucleating agents and mixing aids other ingredients can be incorporated. Any of the additives commonly used in polymer extrusion can be used here also as for example, dyes, pigments, stabilizers, surfactants, plasticizers, softeners, flame retardants and the like. The presence of a stabilizer and surfactant is beneficial and gives optimum results.

It may be desirable in some cases, particularly where the fibrous material is composed of glass, to treat the material with an agent or agents which improve the adhesion of the material to the polymer. For example, the fibrous material can be treated with a solution of a nitrogen containing silane compound having the general formula

where R is an organic radical; X is selected from halo, hydroxy, alkoxy, aryloxy, organo oxycarbonyl, azido, amine and amide radicals; T is selected from alkyl, aryl, alkaryl, and aralkyl radicals; a is an integer from 1 to 3; b is an integer from 0 to 2; c is an integer from 1 to 10; d is an integer from 1 to 3; and a+b+d equals 4; and Z is selected from

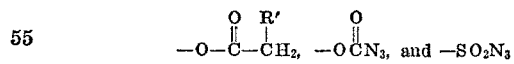

where R' is selected from hydrogen, alkyl, aryl, and —COOR'' radicals; where R'' is selected from alkyl and aryl radicals. Typical of the nitrogen containing silane compounds are the diazosilanes such as 10-[3(-trimethoxysilylpropyl)carbamoyl]decyl diazoacetate, 3-(trimethoxysilyl) propyl - α - diazo - α - carboethoxy acetate, 3-(trimethoxysilyl) propyl diazoacetate, etc., and the azidosilanes such as 2 - chloro - 3 - [3 - (trimethoxysilyl)-propoxy]propyl azidoformate, 3 - (trimethoxysilyl)propyl azidoformate, (trimethoxysilyl) hexyl sulfonylazide, chlorinated (trimethoxysilyl) amyl sulfonylazide, (trimethoxysilyl) cyclohexyl sulfonylazide, 2 - (trimethoxysilyl) ethyl benzene sulfonylazide, etc. By another modification the fibrous material can be conjointly treated with (1) a coupling agent selected from organosilanes such as vinyltriacetoxy silane, γ - methacryloxypropyltrimethoxy silane, γ - aminopropyltrimethoxy silane, etc.; ethylenically unsaturated carboxylic acid chromium chloride complexes such as methacrylate chromium chloride complex, etc.; unsaturated carboxylic acids and anhydrides such as acrylic acid, phthalic anhydride, etc.; and unsaturated organophosphorus compounds such as dichlorophenyl phosphine, phenyl phosphinic acid, etc., and (2) a polyfunctional azide having the general formula

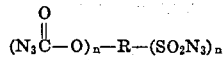

$$(N_3\overset{O}{\underset{\|}{C}}-O)_n-R-(SO_2N_3)_n$$

where R is an organic radical, $n$ is an integer from 0 to 10 and the sum of $n+n$ is an integer from 2 to 10. Typical polyfunctional azides are tetramethylene bis(azidoformate), 1,9 - nonane bis(sulfonazide), 3 - azidocarbonyloxypropyl sulfonylazide, etc. By still another modification both the polymer and the fibrous material can be treated to improve adhesion. For example, fibrous material such as glass fibers can be treated with an organic silane having at least one substituent reactive with the surface of the glass fiber and at least one acid reactive organic substituent such as γ-glycidoxypropyltrimethoxy silane, γ-aminopropyltriethoxy silane, etc. A polymer such as polypropylene can be reacted with an ethylenically unsaturated carboxylic acid or anhydride such as maleic acid or anhydride. When the thus modified polymer is reinforced with the treated glass fiber the free acid reactive organic substituents of the organic silanes react with the free carboxylic acid groups on the polymer forming a tight bond.

The process of this invention can be used in the preparation of reinforced foam sheets of different sizes, shapes and densities. For example, the process of this invention can be used in the production of reinforced foam sheets varying in width from several inches up to 10 or more feet, and the thickness of the sheets can vary from 10 mils to 1 inch.

The following examples will illustrate the invention. All parts and percentages are by weight unless otherwise stated.

EXAMPLE 1

The following example was conducted on a Prodex single screw extruder equipped with a die head as shown in FIG. 1 of the drawing. Viscose rayon tow (120 filaments, 1.5 denier per filament) was used as the fibrous reinforcing material. The speed of the cutter blades and the rate of feed of the fiber was such as to result in fiber segments ⅛ inch long. Low density branched chain polyethylene was compounded with the following ingredients in a ribbon blender prior to extrusion.

| Ingredients: | Parts |
| --- | --- |
| Polyethylene [1] | 100 |
| CaSiO | 0.2 |
| Zinc stearate | 0.25 |
| Heptane | 7.5 |

[1] Having a density of 0.925.

The above composition was fed through the hopper into the extruder and dichlorodifluoromethane (primary blowing agent) was injected into the extruder through an inlet at a rate sufficient to produce a foam of 6 lbs. per cubic foot. The temperature within the extruder was maintained at approximately 315° F. and the stock temperature at the die was maintained at approximately 290° F. During the extrusion the pressure behind the die was 1900 p.s.i.g. and 94 lbs. per hour of 6 lb. per cubic foot density foam was produced. The annular die used to form the foam tube was 3½ inches in diameter. Following its extrusion the tube was expanded to 24 inches in circumference. As the tube left the die fibers were deposited evenly on its inside walls at a rate of 0.01 lb. per sq. ft. Approximately 20 inches from the dye sets of rollers progressively brought the opposite sides of the tube together and directed them into the nip of a pair of calendering rolls. The internal temperature of the flattened tube as it reached the calendering rolls was approximately 235° F. The calendering rolls were held sufficiently close together that the flattened tube fused as a laminated sheet. The calendering rolls were maintained at a temperature of approximately 75° F. The tensile strength of the thus reinforced foam sheet was twice that of an unreinforced control sheet prepared the same way except for the deposition of the rayon fibers.

EXAMPLE 2

The following example was conducted on an extruder as described in Example 1 except that in place of the rotary cutter blades the die was equipped with a rotating air jet.

Styrene-acrylonitrile copolymer was compounded with the following ingredients in a ribbon blender prior to extrusion.

| Ingredients: | Parts |
| --- | --- |
| Styrene-acrylonitrile copolymer [1] | 100 |
| CaSiO | 0.2 |
| Zinc stearate | 0.25 |
| Heptane | 7.5 |

[1] 90% styrene, 10% acrylonitrile.

The above composition was fed through the hopper into the extruder and dichlorodifluoromethane was injected into the extruder through an inlet at a rate sufficient to produce a foam of 5 lbs. per cubic foot. The temperature within the extruder was maintained at approximately 270° F. and the stock temperature at the die was maintained at approximately 250° F. During the extrusion the pressure behind the die was 1200 p.s.i.g. and 94 lbs. per hour of 5 lbs. per cubic foot density foam was produced. The annular die used to form the foam tube was 3½ inches in diameter. As the tube left the die treated glass fibers were blown uniformly on its inside walls at a rate of approximately 0.05 lb. per square foot. The treated glass fibers had been prepared from heat cleaned 204 filament per strand, 20 end, rovings. Each filament had a diameter of 0.00051 inch. The rovings were treated by immersing in a water bath containing 0.4% by weight of 2-(trimethoxysilyl)ethylbenzene sulfonylazide, drying in an oven at 200° C. for 70 seconds and then chopping into ½ inch strands. Following its extrusion the tube was expanded to 24 inches in circumference. Approximately 20 inches from the die sets of rollers progressively collapsed the tube and directed it into the nip of a pair of calendering rolls. The internal temperature of the flattened tube was approximately 230° F. as it reached the calendering rolls. The rolls were held sufficiently close together that the flattened tube fused as a laminated sheet. The calendering rolls were maintained at a temperature of approximately 75° F. The tensile strength of the thus reinforced foam sheet was three times that of an unreinforced control sheet prepared the same way except for the deposition of the treated glass fibers.

What I claim and desire to protect by Letters Patent is:
1. A process for producing fiber reinforced foam thermoplastic sheets which comprises (1) forcing a molten foamable thermoplastic composition through an annular die forming a foamed tube, (2) depositing a plurality of reinforcing fibers on the interior surface of the said tube, the amount of said reinforcing fibers deposited on the tube interior surface being such as to still allow fusion of the interior surface of the tube when collapsed, and (3) thereafter collapsing and flattening the said tube while the interior thereof is sufficiently warm to fuse the interior surface and form an integral reinforced foam thermoplastic sheet.

2. The process of claim 1 wherein the thermoplastic is polyethylene.

3. The process of claim 1 wherein the thermoplastic is styrene-acrylonitrile copolymer.

4. The process of claim 1 wherein the fibers are glass fibers.

5. The process of claim 1 wherein the fibers are rayon fibers.

6. The process of claim 1 wherein the reinforcing fibers have been pretreated to increase its adhesion to the thermoplastic.

References Cited

UNITED STATES PATENTS

| | | | |
|---|---|---|---|
| 3,094,449 | 6/1963 | Sisson | 264—47 X |
| 3,159,698 | 12/1964 | Suh | 264—47 X |
| 3,298,884 | 1/1967 | Willy | 264—47 X |
| 3,411,981 | 11/1968 | Thomas | 264—47 X |
| 3,436,447 | 4/1969 | Meitinger | 264—174 X |
| 3,487,149 | 12/1969 | Bunish | 264—174 |

ROBERT F. WHITE, Primary Examiner

R. R. KUCIA, Assistant Examiner

U.S. Cl. X.R.

156—77; 264—95, 174, 321

UNITED STATES PATENT OFFICE
CERTIFICATE OF CORRECTION

Patent No. 3,649,731  Dated March 14, 1972

Inventor(s) Edward W. Cronin (Case 2)

It is certified that error appears in the above-identified patent and that said Letters Patent are hereby corrected as shown below:

Column 1, line 12; "as extruding" should read --as by extruding--

Column 4, formula on line 55;

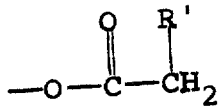 should read 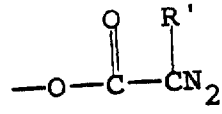

Signed and sealed this 18th day of July 1972.

(SEAL)
Attest:

EDWARD M. FLETCHER, JR.
Attesting Officer

ROBERT GOTTSCHALK
Commissioner of Patents